US007801697B2

(12) United States Patent
Wissman

(10) Patent No.: US 7,801,697 B2
(45) Date of Patent: Sep. 21, 2010

(54) METHOD AND DEVICE FOR TESTING COMMUNICATION CIRCUITS

(75) Inventor: Charles Wissman, Carlsbad, CA (US)

(73) Assignee: Heritage Technologies, Inc., Encinitas, CA (US)

( * ) Notice: Subject to any disclaimer, the term of this patent is extended or adjusted under 35 U.S.C. 154(b) by 389 days.

(21) Appl. No.: 12/106,238

(22) Filed: Apr. 18, 2008

(65) Prior Publication Data

US 2008/0294359 A1 Nov. 27, 2008

Related U.S. Application Data

(60) Provisional application No. 60/939,530, filed on May 22, 2007.

(51) Int. Cl.
*G01R 27/28* (2006.01)
(52) U.S. Cl. ..................................... 702/118
(58) Field of Classification Search ................. 702/117, 702/118, 182–185, 188
See application file for complete search history.

(56) References Cited

U.S. PATENT DOCUMENTS 4,195,769 A * 4/1980 Elias et al. .................... 714/25
5,157,336 A 10/1992 Crick
5,436,953 A 7/1995 Nilson

OTHER PUBLICATIONS

ANSI/IEEE Standard 455 entitled "IEEE standard test procedure for measuring longitudinal balance of telephone equipment operating in the voice band" dated Jul. 25, 1985.

* cited by examiner

*Primary Examiner*—Edward Raymond
(74) *Attorney, Agent, or Firm*—Manuel F. de la Cerra

(57) ABSTRACT

A novel method for testing a communications circuit is disclosed. The method includes the following steps: (a) connecting an internal balanced circuit to a well-balanced resistor network; (b) measuring a first plurality of real and imaginary components of the voltages with the internal balanced circuit connected to the well-balanced resistor network; (c) calculating an error for the internal balanced circuit based on the first plurality of voltages; (d) connecting the internal balanced circuit to the communications circuit; (e) measuring a second plurality of real and imaginary components of the voltages with the internal balanced circuit connected to the communications circuit; and (f) calculating a corrected balance for the communications circuit based on the second plurality of voltages and the error for the internal balanced resistor network. A novel device and software program that incorporates this novel method are also disclosed.

32 Claims, 7 Drawing Sheets

METHOD AND DEVICE FOR TESTING COMMUNICATION CIRCUITS

CLAIM OF PRIORITY

This patent application claims priority to provisional patent application No. 60/939,530 entitled "Improved Method and Device for Testing Telephone Communication Lines", filed by Charles Wissman on May 22, 2007.

FIELD OF THE INVENTION

The present invention relates to devices and methods for testing communication circuits.

BACKGROUND

In spite of more fiber being deployed in the telecommunications industry, communication lines consisting of a twisted pair are still the most common for delivering signals to customer's premises. This is true for both voice and high speed data.

One common measure of the quality of the twisted pair line is the longitudinal balance of the line. The longitudinal balance is a measure of how well the line rejects external noise. Such noise may come from several sources such as power influence from external power sources, cross talk from adjacent pairs in the cable, and external radio interference (which is more important with high speed data communication).

To understand how longitudinal balance is measured, a short bit of background is necessary. The twisted pair line is a 3 terminal device: (1) the "Tip" is one wire in the pair, (2) the "Ring" is the other wire in the pair, and (3) the "Shield" surrounding the cable. The longitudinal balance is how well matched the impedance between Tip and Shield is compared to the impedance between Ring and Shield.

The basic method of measuring the balance of a line is outlined in the Institute of Electrical and Electronics Engineers (IEEE) Standard 455. FIG. 1 is from the IEEE Standard 455. A balanced circuit (102) internal to a test instrument (104) is connected to twisted pair line in a bridge configuration—i.e., one terminal is connected to the Tip (105) and one to the Ring (110). The test equipment then sends an AC signal (115) onto the Shield of the cable (i.e., a common mode signal in generic engineering terms or a longitudinal signal in industry terms). Any impedance mismatch between the Tip side of the line and the Ring side will result in a signal appearing between Tip and Ring (120) (i.e., a differential signal in generic engineering term or a metallic signal in industry terms). The longitudinal balance is given by the following equation:

$$V_m/V_s \text{ or } (V_t - V_r)/V_s$$

In more generic engineering terms (known as the common mode rejection ratio), this equation can be expressed as:

$$V_{differential}/V_{common\ mode} \text{ usually measured in dB}$$

It is known that achieving the best balance on the circuit under test (i.e., the lowest longitudinal balance or the lowest common mode rejection ratio) is limited by the test equipment—specifically by the test equipment's internal balanced circuit. Ideally, the internal balanced circuit is perfectly balanced, that is the impedance presented to the Tip is exactly the same as the impedance presented to the Ring. Said another way with reference to FIG. 1, $Z_1=Z_2$.

In practice, however, the internal balanced circuit is not perfectly balanced. Rather, it is a network of resistor, capacitors, and sometimes inductors that have impedance. The internal balanced circuit of most practical instruments includes series capacitors to block any DC current flow, which allows for the testing of lines that are connected to central office equipment. Making the series capacitance as large a possible reduces the impedance of the capacitors, and therefore minimizes their effect on the balance of the internal balanced circuit. There is a practical limit to this however; physical size, expense, and ability to withstand high voltage that sometimes occurs on lines in service limit the amount of capacitance that can be used in a practical device.

Currently in most instruments the series capacitors are hand matched and trimmed, which is labor intensive and time consuming. An example of one instrument that requires hand matching of the series capacitors is U.S. Pat. No. 5,157,336 at 6:5-6 where the capacitors "... are selected in a manner know to one skilled in the art ... ." Even after hand-matching and trimming the capacitors, their capacitance will drift over time and temperature. Also, each capacitor usually drifts at different rates than the others used in the internal circuit such that it may be impossible to maintain an acceptable level of balance in the internal balanced circuit.

U.S. Pat. No. 5,436,953 by Nilson discusses some of the problems with trying to maintain the precision of an internal balanced circuit. Nilson teaches a method of mathematically correcting for the imbalance of the internal balanced circuit by measuring the balance of the cable in "at least two different connection profiles." Because the Nilson method requires a relay switch for every measurement, the method works best when only a few measurements must be taken daily—e.g., central office equipment. However it is not well suited to a portable test instrument intended for trouble-shooting which needs to make continuous measurements at rates at least several times per second. Relays would slow down the measurement and wear out quickly. The typical lifespan of a relay is 100,000 operations, which is less than 28 hours of operation at one switch per second.

What is needed therefore is a circuit and method that quickly and efficiently compensates for the internal imbalance and has a long operational lifetime.

SUMMARY OF THE INVENTION

A novel method for testing a communications circuit is disclosed. The method includes the following steps: (a) connecting an internal balanced circuit to a well-balanced resistor network; (b) measuring a first plurality of real and imaginary components of the voltages with the internal balanced circuit connected to the well-balanced resistor network; (c) calculating an error for the internal balanced circuit based on the first plurality of voltages; (d) connecting the internal balanced circuit to the communications circuit; (e) measuring a second plurality of real and imaginary components of the voltages with the internal balanced circuit connected to the communications circuit; and (f) calculating a corrected balance for the communications circuit based on the second plurality of voltages and the error for the internal balanced resistor network. In one embodiment, the method further comprises repeating steps (a) through (c) at a predetermined interval, such as when the internal balanced circuit is powered-on The method may also include the steps of communicating the calculated corrected balance to a user, and that may be accomplished by a visual and/or audio device. The method at step (c) may calculate the error using the following equation (labeled Eq. 10 in the detailed description):

$$\text{Error} = \frac{dZb}{Zb} = \frac{MeasuredV_{bal}}{\frac{Vt}{Vs}\left(1 - \frac{Vr}{Vs}\right)}$$

The method may calculate the correct balance of step (f) using the following equation (labeled Eq. 8 in the detailed description):

$$CorrectedBalance = MeasuredV_{bal} - \frac{dZb}{Zb}\frac{Vt}{Vs}\left(1 - \frac{Vr}{Vs}\right)$$

The method may also accommodate for errors associated with a differential amplifier by calculating a corrected $V_{bal}$. The corrected $V_{bal}$ may be used in the calculation steps (c) and (f). This calculation may be performed using the following equation (labeled Eq. 11 in the detailed description):

$$CorrectedV_{bal} = MeasuredV_{bal} - \frac{V_t}{V_s}V_{bal\_short}$$

A novel device for testing a communications circuit is also disclosed. The device comprising a circuit board connected to a central processing unit. The circuit board further includes a switch, an internal balanced circuit, a well-balanced resistor network, and a plurality of leads adapted to connect to the communications circuit. The switch can selectively connect the internal balanced circuit to the well-balanced resistor network or to the plurality of leads. The central processing unit is programmed to perform the steps of the novel method described above. The device can also include a signaling device connected to the central processing unit. Non-limiting examples of the signaling device may include a monitor, display, touch screen display, speaker, light, LED, visual signaling device, audio signaling device and combination thereof. The device may also include a control device connected to the central processing unit. Non-limiting examples of the control device may include a mouse, pointing device, keyboard, a touch screen display and combination thereof.

Finally, a computer readable medium having stored thereon one or more sequences of instructions for causing one or more microprocessors to perform the steps for testing a communications circuit, wherein the steps comprise those of the novel method described above.

BRIEF DESCRIPTION OF THE DRAWINGS AND ATTACHMENT

Figure 3:
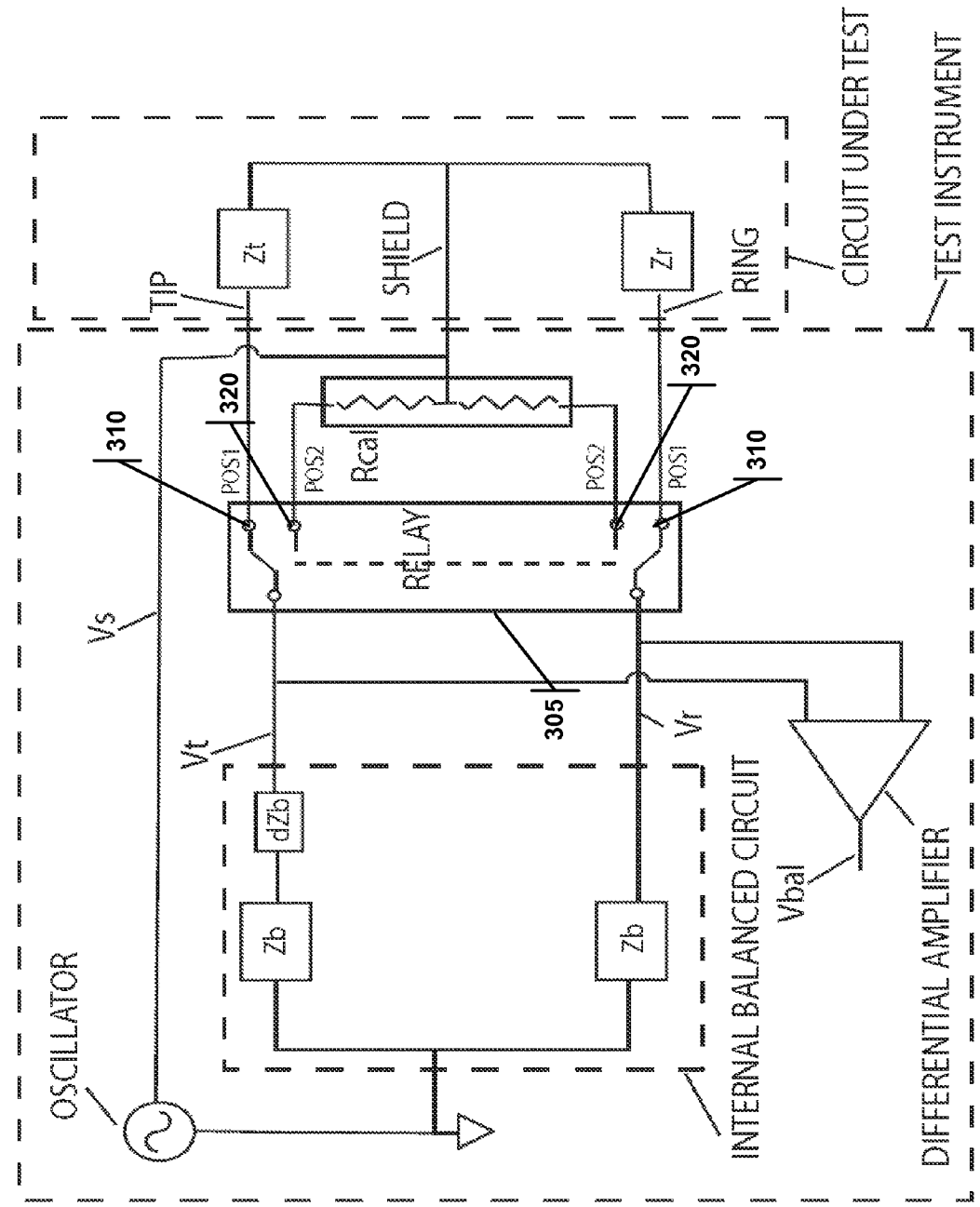

FIG. 3 presents a schematic of a novel testing device with a Resistor Calibrator Network ($R_{cal}$).

Figure 4:
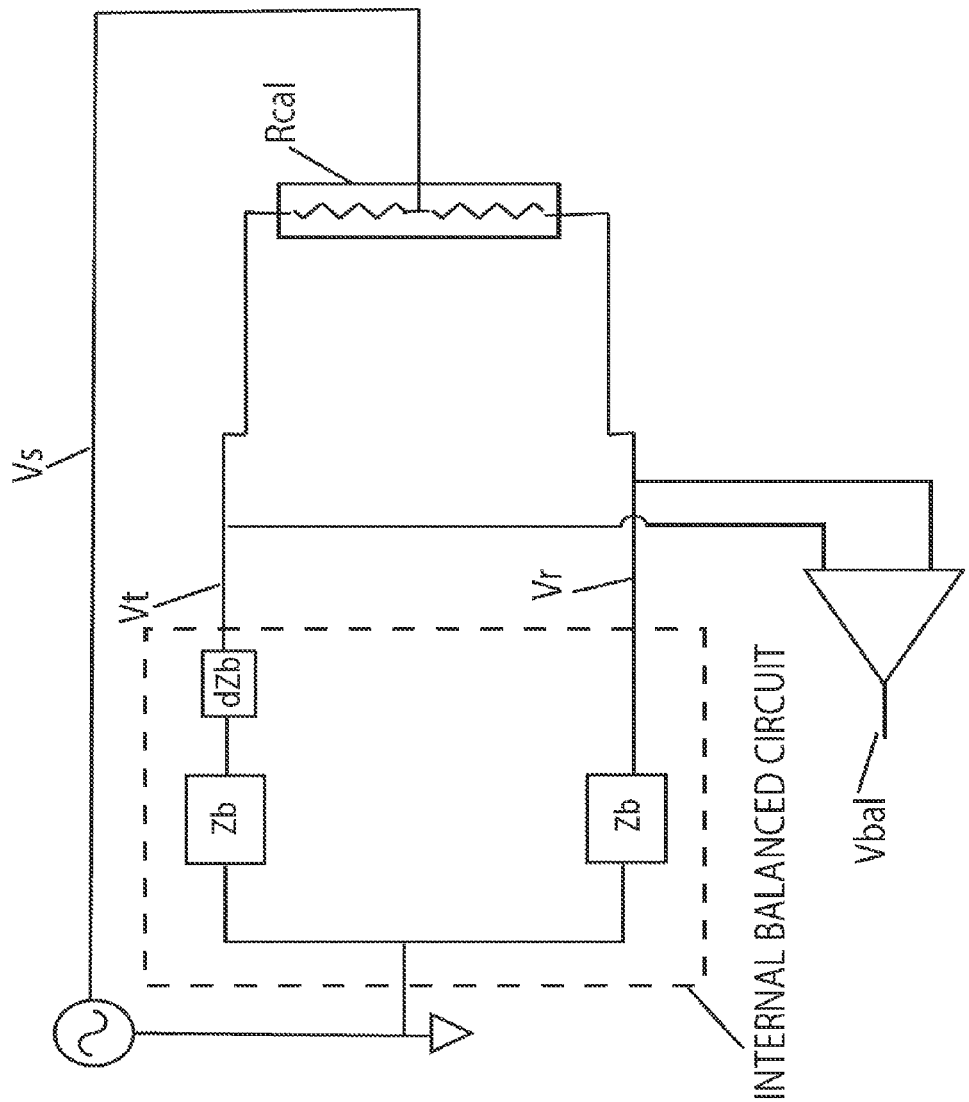

FIG. 4 illustrates a schematic of a novel testing device when the relay is in the POS2 position.

Figure 5:
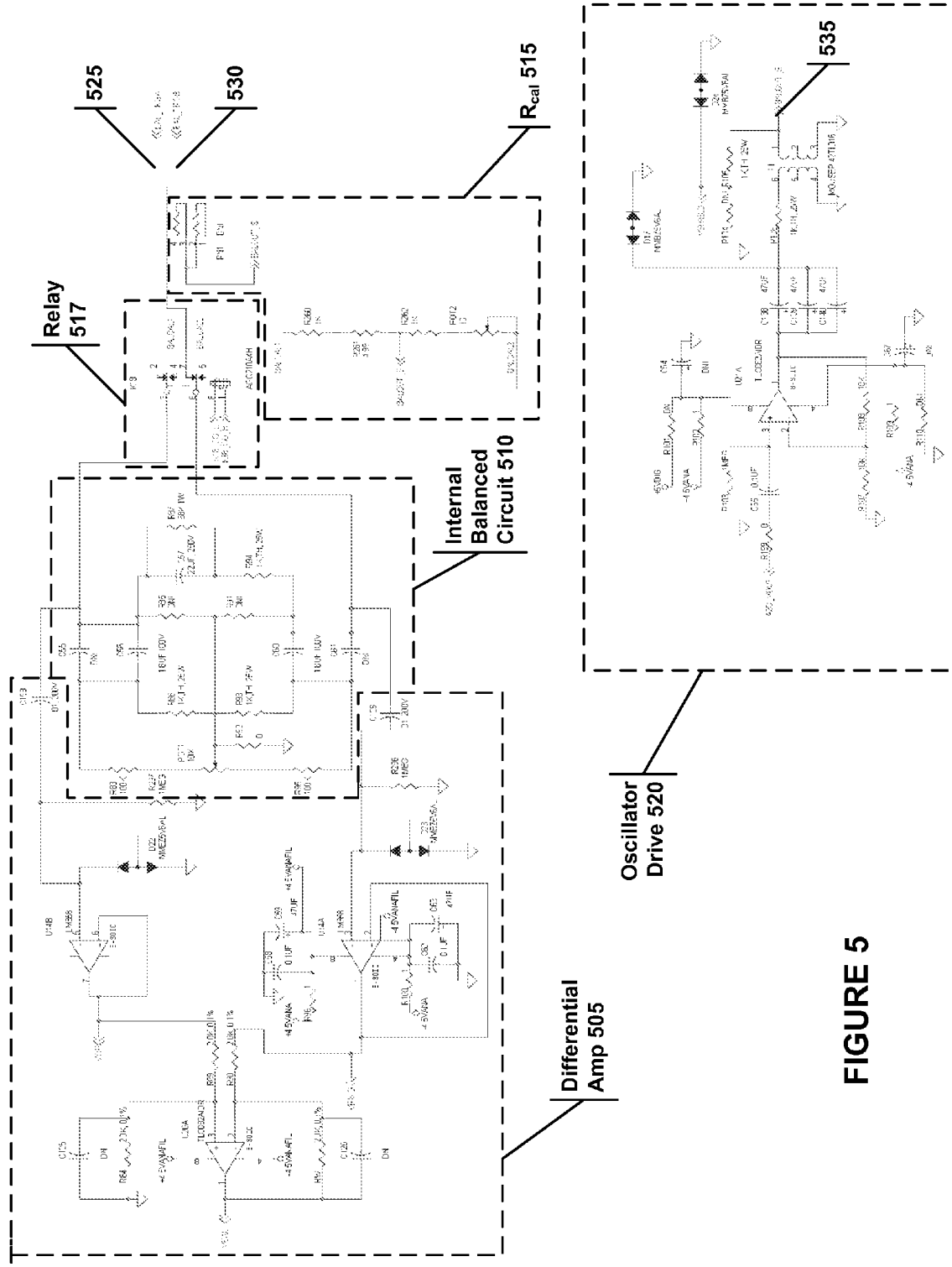

FIG. 5 presents a detailed schematic of a novel testing device, including the differential amplifier, the internal balanced circuit, Resistor Calibrator Network ($R_{cal}$) and the oscillator drive.

Figure 6:
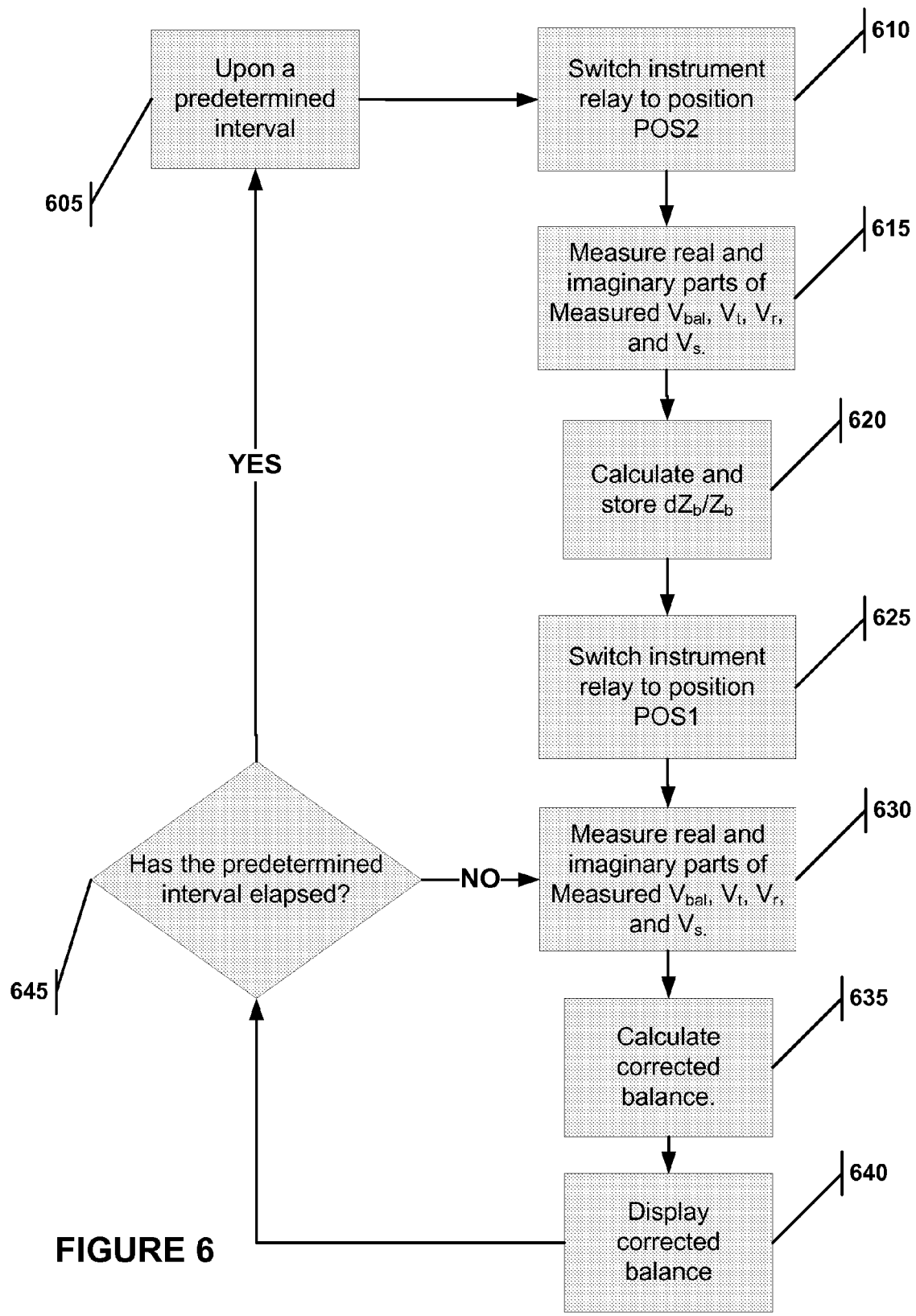

FIG. 6 is a flowchart that illustrates a novel method for testing communication circuits.

Figure 7:
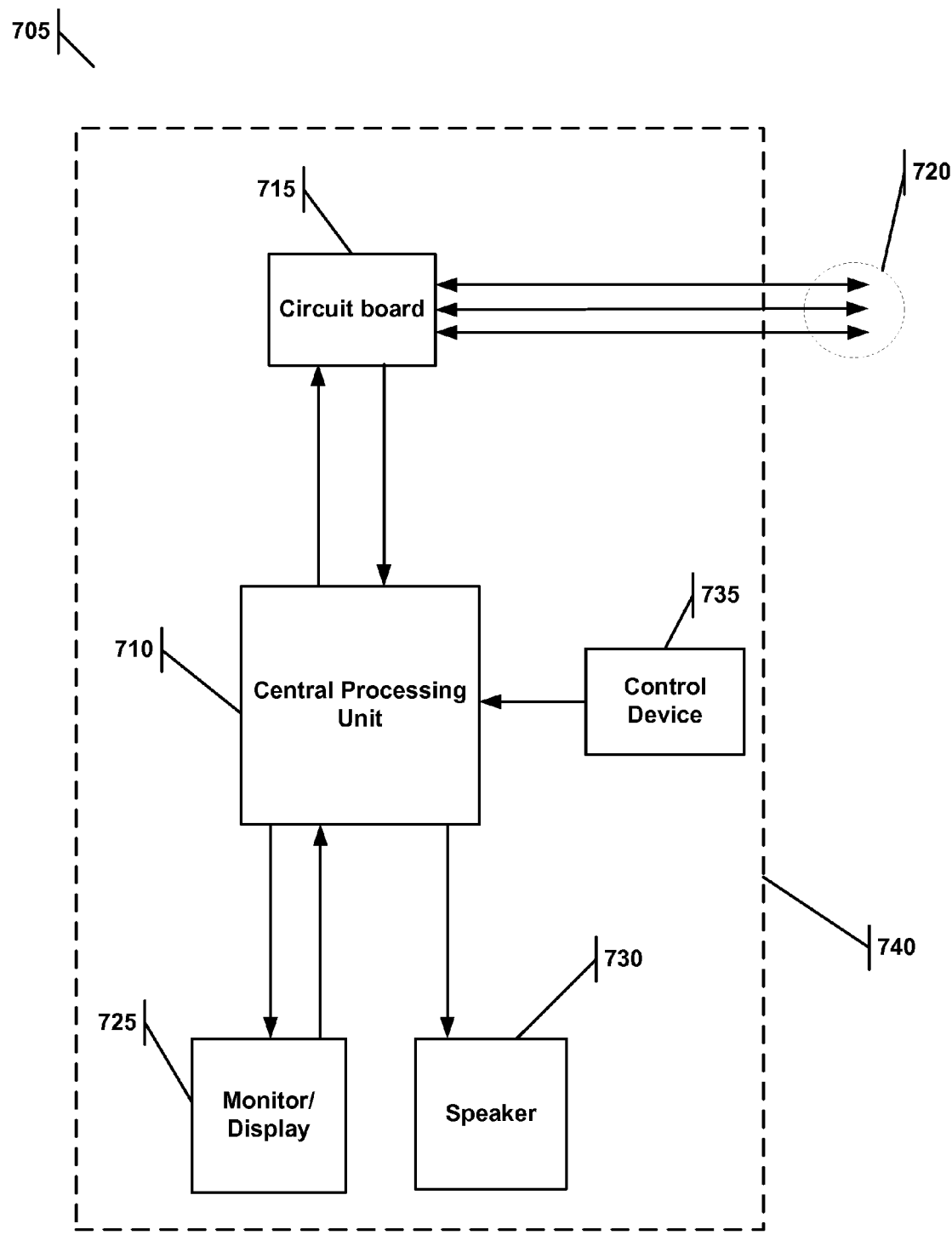

FIG. 7 illustrates a novel device incorporating the method and circuits described herein.

The appendix is an example of the source code used to implement the novel method described herein.

DETAILED DESCRIPTION

What is described below is a novel device and method for testing communication circuits. The device implementing the mathematical method compensates for the imbalance of the internally balance circuits currently found in conventional testing equipment. This results in a device that is more robust, accurate and sensitive.

Figure 1:
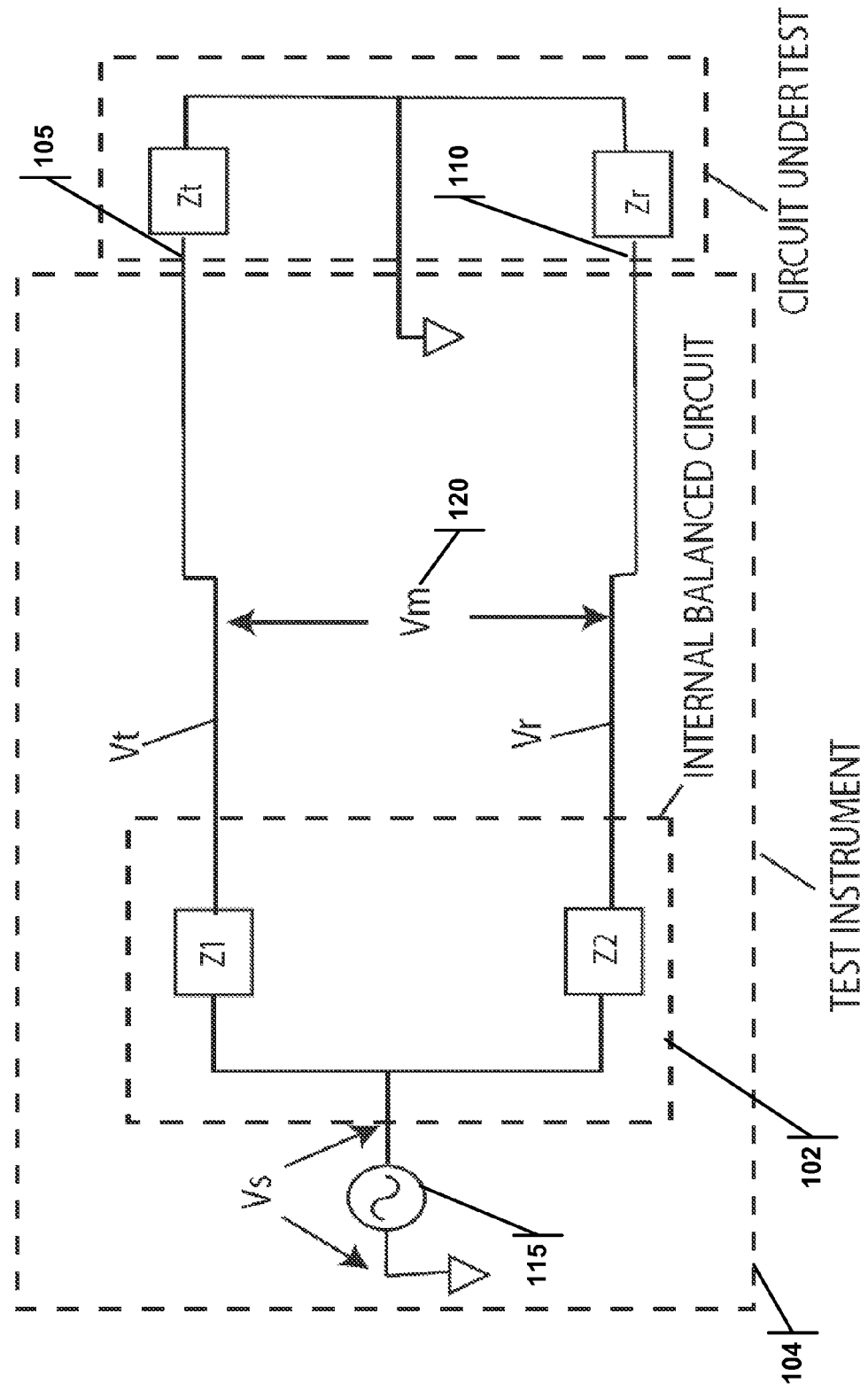
FIG. 1 illustrates the circuit/testing diagram from IEEE Standard 455.
Figure 2:
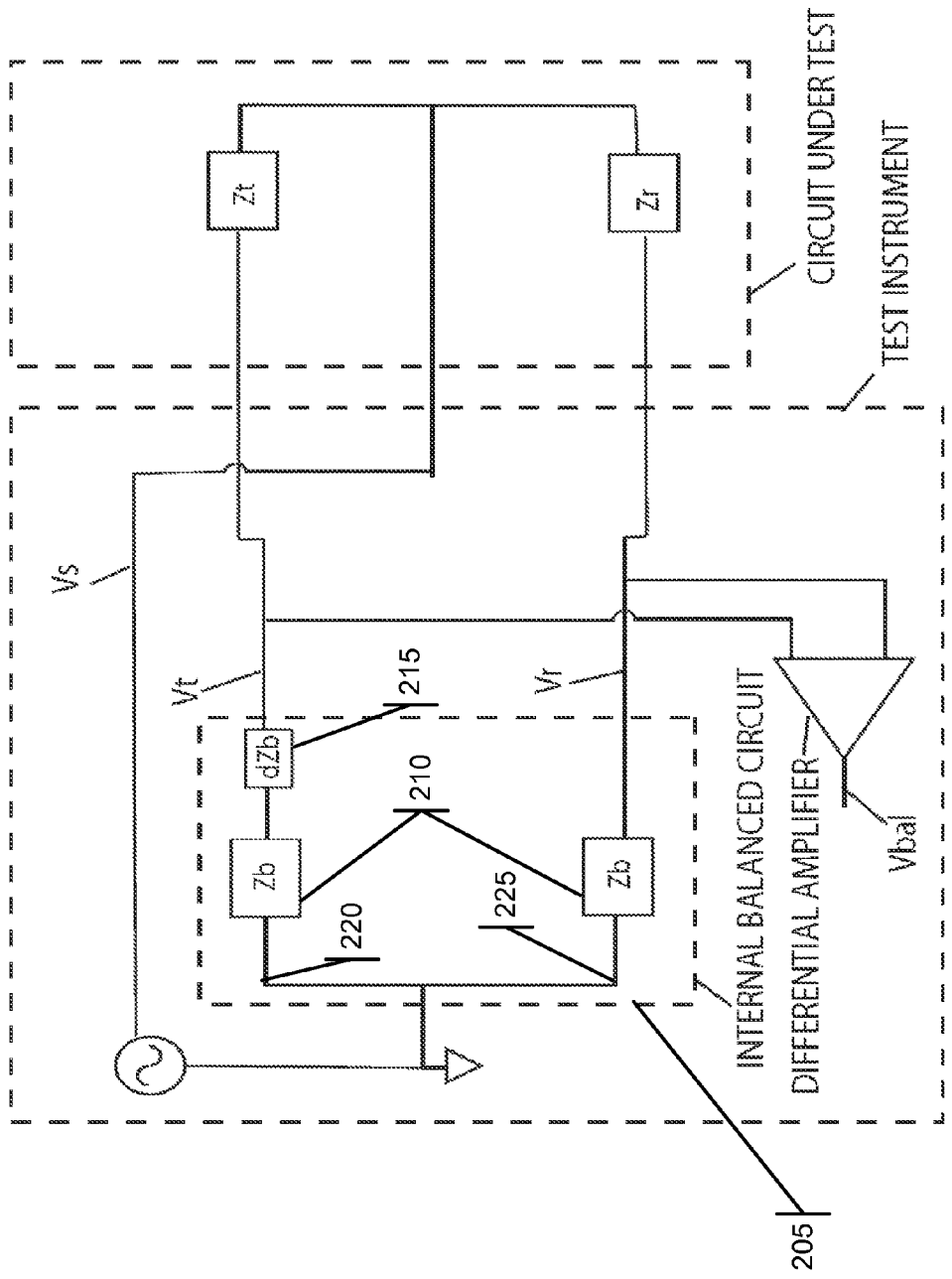
FIG. 2 illustrates a reconfiguration of the circuit/testing diagram from IEEE Standard 455 (FIG. 1).

FIG. 2 is essentially the same circuit as represented by FIG. 1 from IEEE 455, but some components have been reconfigured to simplify the equations. The internal balanced circuit (205) is now modeled as two identical lumped impedances ($Z_b$) shown as part 210, with any difference in the impedances presented to Tip and Ring represented by $dZ_b$ (215). The $Z_1$ of FIG. 1 is now $Z_b + dZ_b$ in FIG. 2, while the $Z_2$ of FIG. 1 is now $Z_b$ in FIG. 2. In perfectly balanced internal balanced circuit $dZ_b = 0$. By measuring the imbalance (i.e., $dZ_b$) of the internal balance circuit (205), a mathematical method can be used to compensate for the imbalance.

Referring back to FIG. 1 and using voltage divider equations, $$\text{Balance} = \frac{V_{bal}}{V_s} = \frac{V_t - V_r}{V_s} = \frac{Zb + dZb}{Zb + dZb + Zt} - \frac{Zb}{Zb + Zr} \quad \text{(Eq. 1)}$$

As long as the impedance in the two branches (i.e., branches 220 and 225) are reasonably matched such that $dZ_b \ll Z_b$, then using the result of Eq. 1:

$$\frac{Zb + dZb}{Zb + dZb + Zt} \approx \frac{Zb + dZb}{Zb + Zt} \quad \text{(Eq. 2)}$$

Combining the simplification of Eq. 2 back into Eq. 1, yields:

$$\text{Balance} \approx \frac{Zb(Zr - Zt) + dZbZr}{(Zb + Zr)(Zb + Zr)} \text{ or } \frac{Zb(Zr - Zt)}{(Zb + Zr)(Zb + Zr)} + \frac{dZbZr}{(Zb + Zr)(Zb + Zr)} \quad \text{(Eq. 3)}$$

The error created by $dZ_b$ is just the right hand component of Eq. 3:

$$\text{Error} \approx \frac{dZbZr}{(Zb + Zr)(Zb + Zr)} \quad \text{(Eq. 4)}$$

Again referring to FIG. 2 and using voltage divider equations:

$$Zr = Zb\left(\frac{Vs}{Vr} - 1\right) \quad \text{(Eq. 5)}$$

$$Zt = (Zb + dZb)\left(\frac{Vs}{Vt} - 1\right) \approx Zb\left(\frac{Vs}{Vt} - 1\right) \quad \text{(Eq. 6)}$$

Substituting Eqs. 5 and 6 into Eq. 4 yields:

$$\text{Error} = \frac{dZb}{Zb}\frac{\left(\frac{Vs}{Vr}-1\right)}{\frac{Vs}{Vt}\frac{Vs}{Vr}} = \frac{dZb}{Zb}\frac{Vt}{Vs}\left(1 - \frac{Vr}{Vs}\right) \quad \text{(Eq. 7)}$$

The corrected balance is equal to the error (Eq. 7) subtracted from the measured balance. Or stated as an equation:

$$CorrectedBalance = MeasuredBalance - \frac{dZb}{Zb}\frac{Vt}{Vs}\left(1 - \frac{Vr}{Vs}\right) \quad \text{(Eq. 8)}$$

All the terms of Eq. 8 can be measured in real-time by the instrument, except for $dZ_b/Z_b$. The lower $dZ_b/Z_b$ is, the better the improvement correction from the mathematical method works. For example, even with $dZ_b/Z_b=0.1$, which represents a fairly poor match, Eq. 8 gives a nearly 40 dB improvement in balance sensitivity. And for a $dZ_b/Z_b=0.05$, Eq. 8 yields a 45 dB improvement.

Referring now to FIG. 3, a schematic of an embodiment of the novel device is presented. The device contains a relay (305) (or other switching mechanism) that switches the device between two states. When relay (305) switched to POS1 (310) then the internal balanced circuit of the device is connected to the circuit under test (also referred to herein as a communications circuit) and the entire network (instrument and circuit under test) is represented by FIG. 2. When the relay (305) switched to POS2 (315) the internal balanced circuit is connected to Resistor Calibrator Network ($R_{cal}$), and the network is represented by FIG. 4.

Returning to Eq. 8, the only term that is not measured real time by the instrument is $dZ_b/Z_b$. To measure this term, the relay (305) of FIG. 3 is positioned so that the internal balanced circuit is placed in POS2 (320) such that the internal balanced circuit is connected to $R_{cal}$. The network in POS2 is represented by FIG. 4. $R_{cal}$ is a well matched resistor network that may be internal to the test instrument. Resistors have a significant advantage over capacitors in that resistors are very easy to accurately match. Also, resistors are much more stable than capacitors, so they do not drift as dramatically from their initial performance characteristics. An example of commercially available matched resistor networks is T912-1K-010-02 from Caddock Electronics. Also the resistor network can be hand trimmed with relatively inexpensive and stable trim potentiometers.

$R_{cal}$ can be chosen or trimmed to be so well balanced that its balance approaches 0. One such embodiment is illustrated in schematic of FIG. 5. This schematic details the differential amplifier (505), the internal balanced circuit (510), the $R_{cal}$ (515) and the oscillator drive (520). Also, the inputs to the system are the BAL_TRGA (525) which is connected to the Tip wire, and the BAL_TRGB (530) which is connected to the Ring wire. The output of the system is BALOUT_S (535) that outputs an AC signal (115) onto the Shield of the cable (i.e., a common mode signal in generic engineering terms or a longitudinal signal in industry terms).

When a well balanced $R_{cal}$ is used, as in FIG. 5, Eq. 8 becomes:

$$0 = MeasuredV_{bal} - \frac{dZb}{Zb}\frac{Vt}{Vs}\left(1 - \frac{Vr}{Vs}\right) \quad \text{(Eq. 9)}$$

$$\frac{dZb}{Zb} = \frac{MeasuredV_{bal}}{\frac{Vt}{Vs}\left(1 - \frac{Vr}{Vs}\right)} \quad \text{(Eq. 10)}$$

Now that the error created by $dZ_b$ has been quantified it can be compensated for mathematically using Eq. 8. It should be noted that the terms in the above equations are vector (complex) quantities, with real and imaginary components. Thus, calculations should be made using vector algebra. U.S. Pat. No. 5,436,953 from Nilson teaches a form of synchronous detection for measuring the real and imaginary components of the different voltages, and there are other methods that are well know to those of skill in the art. Also, if any of the components that comprise the internal balanced circuit drift, it generally occurs over days, not seconds. So $dZ_b/Z_b$ need only be measured periodically. One possible period may be each time the instrument is turned on, which is convenient and, more importantly, adequate for reliable measurement.

Though not nearly as significant as the error created by the internal balanced circuit, non-ideal behavior of the differential amplifier can also cause an error in balance measurement. This can be caused by operational amplifiers with lower common-mode rejection ratios and parasitic impedances on the circuit board. To compensate for the errors from the differential amplifier, shorting the Tip, Ring and Ground terminals of the instrument together yields the equivalent to FIG. 4 with $R_{cal}=0$. So, $V_t=V_r=V_s$, and any errors have been isolated to differential amplifier. At this point, the value of $V_{bal}$ is measured and stored (which will be referred to herein as $V_{bal\_short}$). Measurement of $V_{bal\_short}$ usually needs to be done only once—typically as part of a final test and calibration before shipping. To compensate for differential amplifier error:

$$CorrectedV_{bal} = MeasuredV_{bal} - \frac{V_t}{V_s}V_{bal\_short} \quad \text{(Eq. 11)}$$

The corrected $V_{bal}$ from Eq. 11 may be used in the place of the measured $V_{bal}$ in the balance equations outlined above, including Eq. 8 and Eq. 10.

Now turning to FIG. 6, a novel method using the equations and devices described above is presented:

A. In steps 605 and 610, the instrument is set to POS2 (see FIG. 3) so that the internal balanced circuit is connected to $R_{cal}$ (a well-balanced resistor network that may be internal to the test instrument). This may be done, for example, with a relay or other switching mechanism. (see part 517 in FIG. 5 and part 305 in FIG. 3) This operation can be performed at any preprogrammed interval, which may include upon power up or at some other predetermined interval.

B. At step 615, the instrument measures the real and imaginary parts of $V_t$, $V_r$, $V_s$, and measured $V_{bal}$ when the internal balanced circuit is connected to the well-balanced resistor network.

C. At step 620, $dZ_b/Z_b$ (the error) is calculated from $V_t$, $V_r$, $V_s$ and measured $V_{bal}$; (see Eq. 10), the calculated value of $dZ_b/Z_b$ is stored for later use.

D. At step 625, the instrument is set to POS1 (see FIG. 3) so that the internal balanced circuit is connected to the circuit under test—typically a twisted pair line. This may be done, for example, with a relay or other switching mechanism. (see part 517 in FIG. 5 and part 305 in FIG. 3)

E. At step 630, the instrument measures the real and imaginary parts of $V_t$, $V_r$, $V_s$, and measured $V_{bal}$ when the internal balanced circuit is connected to the circuit under test.

F. At step 635, using the measured voltages from step 630 along with the previously stored value of $dZ_b/Z_b$, the corrected balance for the circuit under test is calculated. (See Eq. 8)

G. At step 640, the corrected balance may be displayed to the user.

H. At step 645, the method may determine with the predetermined interval has elapsed such that $dZ_b/Z_b$, needs to be recalculated. If so, then the system continues to step 605. Otherwise, the method continues back to step 630. This method may continue this loop, giving the user real-time calculations of the corrected balance.

Finally, FIG. 7 illustrates a device (705) incorporating the method and circuits described herein. The device (705) contains a CPU (710) that controls the circuit board (715). This control could include switching the relay (or other switching mechanism) from POS1 to POS2 as described above. The circuit board (715) includes a plurality of test leads (720) that can both measure the circuit under test (not shown) and may also provide a signal to the circuit under test. The circuit board (715) provides the CPU (710) data regarding the circuit under test, which may include the measured voltages (i.e., $V_t$, $V_r$, $V_s$, and measured $V_{bal}$). And the CPU (710) can then make the appropriate calculations, according to the method described herein. (Attached as Appendix A below is an example of computer source code that can be used with the CPU). The CPU (710) may output the results of its calculations to the display (725) or other visual signaling device. Optionally, the display may include a touch screen, which may send control signals to the CPU (710), hence the bi-directional control lines between the CPU (710) and the display (725). The device (705) may also include a speaker (730) or other audio signaling device, which can communicate the output of the CPU (710) to a user of the device. The user may control the device (705) through the control device (735), which may include a mouse, pointing device, keyboard or a touch screen display. If a touch screen display is used, then it may perform both the function of a display (725) and control device (735). Because it may be desirable to make this device portable, a housing (shown as dashed line 740) may be used to house the circuit board (715), the CPU (710), the control device (735), the display (725) and the speaker (730). The plurality of test leads (720) may exit the housing to allow the user to easily connect the device (705) to the circuit under test.

While the description above refers to particular embodiments of the present invention, it should be readily apparent to people of ordinary skill in the art that a number of modifications may be made without departing from the spirit thereof. The accompanying claims are intended to cover such modifications as would fall within the true spirit and scope of the invention. The presently disclosed embodiments are, therefore, to be considered in all respects as illustrative and not restrictive, the scope of the invention being indicated by the appended claims rather than the foregoing description. All changes that come within the meaning of and range of equivalency of the claims are intended to be embraced therein. Moreover, the applicants expressly do not intend that the following claims "and the embodiments in the specification to be strictly coextensive." *Phillips v. AHW Corp.*, 415 F.3d 1303, 1323 (Fed. Cir. 2005) (en banc).

APPENDIX

```
/******************************************************************
//Calculate_Corrected_Balance( )
Gets Vbal, Vt, Vr, Vs while internal balanced circuit is connected to line under test and
calculates corrected balance using equation corrected_balance = Vbal - dZb*Vt/Vs*(1-
Vr/Vs) (eq. 8)
******************************************************************/
unsigned int Calculate_Corrected_Balance( float scale_factor, char *result_string, int
decimals)
{
        int input_array[10];
    float real_float, imag_float, error_real_float, error_imag_float;
    float corrected_balance_real_float, corrected_balance_imag_float, mag_float,
log_mag_float;
        get_complex_a2d(BAL_HI_AND_TRS_COMMAND, input_array, 8, 2000);
/*
At this point:
i               input array[i]
0               Vbal real
1               Vbal imaginary
2               Vt real
3               Vt imaginary
4               Vr real
5               Vr imaginary
6               Vs real
7               Vs imaginary
*/
    //Correct diffamp null. Use cal constants stored in user block
    //Corrected Vbal = Measure Vbal - (Vt/Vs)*Vbal_short
    Correct_DiffAmp(input_array);
    //Vt/Vs*(1-Vr/Vs)
    real_float = RealBalScaleFactor((float) input_array[2], (float) input_array[3], (float)
input_array[4], (float) input_array[5], (float) input_array[6], (float) input_array[7]);
```

APPENDIX-continued

```
        imag_float = ImagBalScaleFactor((float) input_array[2], (float) input_array[3],
(float) input_array[4], (float) input_array[5], (float) input_array[6], (float)
input_array[7]);
        //dZb/Zb*Vt/Vs*(1−Vr/Vs) //dZb/Zb was measused, calculated and stored at start up.
Now stored in g_bal_cor_flt_xxxx
        error_real_float = RealMult(g_bal_cor_flt_real, g_bal_cor_flt_imag, real_float,
imag_float);
        error_imag_float = ImagMult(g_bal_cor_flt_real, g_bal_cor_flt_imag, real_float,
imag_float);
    //corrected_balance = Vbal − dZb*Vt/Vs*(1−Vr/Vs) (eq. 1)
    corrected_balance_real_float = (float)input_array[0] − error_real_float;
    corrected_balance_imag_float = (float)input_array[1] − error_imag_float;
    //Now calculate magnitude and express in dB
    mag_float = sqrt(corrected_balance_real_float*corrected_balance_real_float +
corrected_balance_imag_float*corrected_balance_imag_float);
    if(mag_float < 10)
    {
        strcpy(result_string, "---");
      return 1;
    }
    log_mag_float = 20 * log10(mag_float) + scale_factor;
    float_to_string(log_mag_float, result_string, decimals);
    return (unsigned int) mag_float;
}
/************************************************************************
        Get_Bal_Cal_and_TRS_Readings( )
Gets Vbal, Vt, Vr, Vs while internal balanced circuit is connected to Rcal (well-balance
resistor network) and calculates dZb/Zb using dZb/Zb = Vbal/((Vt/Vs*(1−Vr/Vs)) (Eq
10) Stores dZb/Zb the global variables g_bal_cor_flt_real, g_bal_cor_flt_imag
************************************************************************/
void Get_Bal_Cal_and_TRS_Readings(void)
{
        int input_array[10], i;
    float real_float, imag_float;
        get_complex_a2d(BAL_CAL_AND_TRS_COMMAND, input_array, 8, 2000);
/*
At this point:
i                       input array[i]
0                       Vbal real
1                       Vbal imaginary
2                       Vt real
3                       Vt imaginary
4                       Vr real
5                       Vr imaginary
6                       Vs real
7                       Vs imaginary
*/
    //for diagnostics. Not used in calculations
    g_bal_cal_real = input_array[0];
    g_bal_cal_imag = input_array[1];
    //Correct diffamp null. Use cal constants stored in user block
    Correct_DiffAmp(input_array);
    //Vt/Vs*(1−Vr/Vs)
    real_float = RealBalScaleFactor((float) input_array[2], (float) input_array[3], (float)
input_array[4], (float) input_array[5], (float) input_array[6], (float) input_array[7]);
        imag_float = ImagBalScaleFactor((float) input_array[2], (float) input_array[3],
(float) input_array[4], (float) input_array[5], (float) input_array[6], (float)
input_array[7]);
        g_bal_cor_flt_real = RealDiv((float)input_array[0], (float)input_array[1], real_float,
imag_float);
        g_bal_cor_flt_imag = ImagDiv((float)input_array[0], (float)input_array[1],
real_float, imag_float);
}
/************************************************************************
        Vector Algebra Functions
************************************************************************/
//Returns real part of multiplication of 2 complex numbers
float RealMult(float RealIn1, float ImaginaryIn1, float RealIn2, float ImaginaryIn2)
{
        return(RealIn1 * RealIn2) − (ImaginaryIn1 * ImaginaryIn2);
}
//Returns imaginary part of multiplication of 2 complex numbers
float ImagMult(float RealIn1, float ImaginaryIn1, float RealIn2, float ImaginaryIn2)
{
        return(RealIn1 * ImaginaryIn2) + (RealIn2 * ImaginaryIn1);
}
//Returns real part of division of 2 complex numbers
float RealDiv(float RealIn1, float ImaginaryIn1, float RealIn2, float ImaginaryIn2)
{
```

APPENDIX-continued

```
        return((RealIn1 * RealIn2) + (ImaginaryIn1 * ImaginaryIn2)) / ((RealIn2 *
RealIn2) + (ImaginaryIn2 * ImaginaryIn2));
}
//Returns imaginary part of division of 2 complex numbers
float ImagDiv(float RealIn1, float Imagin* aryIn1, float RealIn2, float ImaginaryIn2)
{
        return((ImaginaryIn1 * RealIn2) – (RealIn1 * ImaginaryIn2)) / ((RealIn2 *
RealIn2) + (ImaginaryIn2 * ImaginaryIn2));
}
//Returns real part of Vt/Vs*(1–Vr/Vs)
float RealBalScaleFactor(float TipR, float TipI, float RingR, float RingI, float ShieldR,
float ShieldI)
{
        float RealTemp1;
        float RealTemp2;
        float ImagTemp1;
        float ImagTemp2;
        // VTip/VShield
        RealTemp1 = RealDiv(TipR, TipI, ShieldR, ShieldI);
        ImagTemp1 = ImagDiv(TipR, TipI, ShieldR, ShieldI);
        // VRing/VShield
        RealTemp2 = RealDiv(RingR, RingI, ShieldR, ShieldI);
        ImagTemp2 = ImagDiv(RingR, RingI, ShieldR, ShieldI);
        // 1 – VRing/VShield
        RealTemp2 = 1 – RealTemp2;
        ImagTemp2 = –ImagTemp2;
        // VTip/VShield * (1 – VRing/VShield)
        RealTemp1 = RealMult(RealTemp1, ImagTemp1, RealTemp2, ImagTemp2);
        ImagTemp1 = ImagMult(RealTemp1, ImagTemp1, RealTemp2, ImagTemp2);
        return RealTemp1;
}
//Returns imaginary part of Vt/Vs*(1–Vr/Vs)
float ImagBalScaleFactor(float TipR, float TipI, float RingR, float RingI, float ShieldR,
float ShieldI)
{
        float RealTemp1;
        float RealTemp2;
        float ImagTemp1;
        float ImagTemp2;
        // VTip/VShield
        RealTemp1 = RealDiv(TipR, TipI, ShieldR, ShieldI);
        ImagTemp1 = ImagDiv(TipR, TipI, ShieldR, ShieldI);
        // VRing/VShield
        RealTemp2 = RealDiv(RingR, RingI, ShieldR, ShieldI);
        ImagTemp2 = ImagDiv(RingR, RingI, ShieldR, ShieldI);
        // 1 – VRing/VShield
        RealTemp2 = 1 – RealTemp2;
        ImagTemp2 = –ImagTemp2;
        // VTip/VShield * (1 – VRing/VShield)
        // don't corrupt RealTemp1 = RealMult(RealTemp1, ImagTemp1, RealTemp2,
ImagTemp2);
        ImagTemp1 = ImagMult(RealTemp1, ImagTemp1, RealTemp2, ImagTemp2);
        return ImagTemp1;
}
/************************************************************************
*       //Correct diffamp null. Use cal constants stored in user block
Uses the formula Corrected Vbal = Measure Vbal – (Vt/Vs)*Vbal_short (Eq 11) Assumes
Vbal with the Tip and Ring leads shorted to Shield is stored in g_bal_diffamp_null_xxxx
************************************************************************/
void Correct_DiffAmp(int *DataArray)
{
        float VTipNormal_Real, VTipNormal_Imag, DiffError_Real, DiffError_Imag;
        int i;
        //Vtip/Vshield
        VTipNormal_Real = RealDiv((float)DataArray[2], (float)DataArray[3],
(float)DataArray[6], (float)DataArray[7]);
        VTipNormal_Imag = ImagDiv((float)DataArray[2], (float)DataArray[3],
(float)DataArray[6], (float)DataArray[7]);
        DiffError_Real = RealMult((float)g_bal_diffamp_null_real,
(float)g_bal_diffamp_null_imag,VTipNormal_Real, VTipNormal_Imag);
        DiffError_Imag = ImagMult((float)g_bal_diffamp_null_real,
(float)g_bal_diffamp_null_imag,VTipNormal_Real, VTipNormal_Imag);
        DataArray[0] = DataArray[0] – (int) DiffError_Real;
        //g_corrected_diff_real = DataArray[0];
        DataArray[1] = DataArray[1] – (int) DiffError_Imag;
        //g_corrected_diff_imag = DataArray[1];
}
```

The invention claimed is:

1. A method for testing a communications circuit, the method comprising:
   (a) connecting an internal balanced circuit to a well-balanced resistor network;
   (b) measuring a first plurality of real and imaginary components of the voltages with the internal balanced circuit connected to the well-balanced resistor network;
   (c) calculating an error for the internal balanced circuit based on the first plurality of voltages;
   (d) connecting the internal balanced circuit to the communications circuit;
   (e) measuring a second plurality of real and imaginary components of the voltages with the internal balanced circuit connected to the communications circuit; and
   (f) calculating a corrected balance for the communications circuit based on the second plurality of voltages and the error for the internal balanced resistor network.

2. The method of claim 1, further comprising repeating steps (a) through (c) at a predetermined interval.

3. The method of claim 2, wherein the interval is when the internal balanced circuit is powered-on.

4. The method of claim 1, further comprising communicating the calculated corrected balance to a user.

5. The method of claim 4, wherein the calculated corrected balance is communicated to a user through a visual device.

6. The method of claim 4, wherein the calculated corrected balance is communicated to a user through an audio device.

7. The method of claim 1, wherein step (c) calculates the error using the following equation:

$$\text{Error} = \frac{dZb}{Zb} = \frac{MeasuredV_{bal}}{\frac{Vt}{Vs}\left(1 - \frac{Vr}{Vs}\right)}.$$

8. The method of claim 1, wherein step (f) calculates the corrected balance using the following equation:

$$CorrectedBalance = MeasuredV_{bal} - \frac{dZb}{Zb}\frac{Vt}{Vs}\left(1 - \frac{Vr}{Vs}\right).$$

9. The method of claim 1, further comprising:
   (g) calculating a corrected $V_{bal}$ by connecting to a differential amplifier and calculating an error of the differential amplifier.

10. The method of claim 9, wherein step (g) calculates the corrected $V_{bal}$ using the following equation:

$$CorrectedV_{bal} = MeasuredV_{bal} - \frac{V_t}{V_s}V_{bal\_short}.$$

11. The method of claim 9, wherein the calculation step (c) is based on the corrected $V_{bal}$ and the calculation step (f) is based on the corrected $V_{bal}$.

12. The method of claim 1, wherein steps (e) and (f) are repeated, and the calculated corrected balance is communicated to a user.

13. A device for testing a communications circuit, the device comprising:
   a circuit board comprising a switch, an internal balanced circuit, a well-balanced resistor network, and a plurality of leads adapted to connect to the communications circuit, wherein the switch that selectively connects internal balanced circuit to the well-balanced resistor network or the plurality of leads; and
   a central processing unit connected to the circuit board, wherein the central processing unit is programmed to perform the following steps:
      (a) actuating the switch to connect the internal balanced circuit to the well-balanced resistor network;
      (b) measuring a first plurality of real and imaginary components of the voltages with the internal balanced circuit connected to the well-balanced resistor network;
      (c) calculating an error for the internal balanced circuit based on the first plurality of voltages;
      (d) actuating the switch to connect the internal balanced circuit to the communications circuit via the plurality of leads;
      (e) measuring a second plurality of real and imaginary components of the voltages with the internal balanced circuit connected to the communications circuit; and
      (f) calculating a corrected balance for the communications circuit based on the second plurality of voltages and the error for the internal balanced resistor network.

14. The device of claim 13, wherein steps (a) through (c) are performed upon the device being powered-on.

15. The device of claim 13, further comprising a signaling device connected to central processing unit.

16. The device of claim 15, wherein the signaling device is selected from a group consisting of: a monitor, display, touch screen display, speaker, light, LED, visual signaling device, audio signaling device and combination thereof.

17. The device of claim 13, further comprising a control device connected to the central processing unit.

18. The device of claim 17, wherein the control device is selected from a group consisting of: mouse, pointing device, keyboard, a touch screen display and combination thereof.

19. The device of claim 13, wherein step (c) calculates the error using the following equation:

$$\text{Error} = \frac{dZb}{Zb} = \frac{MeasuredV_{bal}}{\frac{Vt}{Vs}\left(1 - \frac{Vr}{Vs}\right)}.$$

20. The device of claim 13, wherein step (f) calculates the corrected balance using the following equation:

$$CorrectedBalance = MeasuredV_{bal} - \frac{dZb}{Zb}\frac{Vt}{Vs}\left(1 - \frac{Vr}{Vs}\right).$$

21. The device of claim 13, wherein the circuit board further comprises a differential amplifier, and central processing unit further performs the following step:
   (g) calculating a corrected $V_{bal}$ by connecting to the differential amplifier and calculating an error of the differential amplifier.

22. The device of claim 21, wherein step (g) calculates the corrected $V_{bal}$ using the following equation:

$$CorrectedV_{bal} = MeasuredV_{bal} - \frac{V_t}{V_s}V_{bal\_short}.$$

23. The device of claim 21, wherein the calculation step (c) is based on the corrected $V_{bal}$ and the calculation step (f) is based on the corrected $V_{bal}$.

24. The device of claim 15, wherein the central processing unit repeats steps (e) and (f), and the calculated corrected balance is communicated to a user through the signaling device.

25. A non-transitory computer readable medium having stored thereon one or more sequences of instructions for causing one or more microprocessors to perform the steps for testing a communications circuit, wherein the steps comprise: (a) connecting an internal balanced circuit to a well-balanced resistor network; (b) measuring a first plurality of real and imaginary components of the voltages with the internal balanced circuit connected to the well-balanced resistor network; (c) calculating an error for the internal balanced circuit based on the first plurality of voltages; (d) connecting the internal balanced circuit to the communications circuit; (e) measuring a second plurality of real and imaginary components of the voltages with the internal balanced circuit connected to the communications circuit; and (f) calculating a corrected balance for the communications circuit based on the second plurality of voltages and the error for the internal balanced resistor network.

26. The computer readable medium of claim 25, wherein the steps further comprise communicating the calculated corrected balance to a user.

27. The computer readable medium of claim 25, wherein step (c) calculates the error using the following equation:

$$Error = \frac{dZb}{Zb} = \frac{MeasuredV_{bal}}{\frac{Vt}{Vs}\left(1 - \frac{Vr}{Vs}\right)}.$$

28. The computer readable medium of claim 25, wherein step (f) calculates the corrected balance using the following equation:

$$CorrectedBalance = MeasuredV_{bal} - \frac{dZb}{Zb}\frac{Vt}{Vs}\left(1 - \frac{Vr}{Vs}\right).$$

29. The computer readable medium of claim 25, wherein the steps further comprise:

(g) calculating a corrected $V_{bal}$ by connecting to a differential amplifier and calculating an error of the differential amplifier.

30. The computer readable medium of claim 29, wherein step (g) calculates the corrected $V_{bal}$ using the following equation:

$$CorrectedV_{bal} = MeasuredV_{bal} - \frac{V_t}{V_s}V_{bal\_short}.$$

31. The computer readable medium of claim 29, wherein the calculation step (c) is based on the corrected $V_{bal}$ and the calculation step (f) is based on the corrected $V_{bal}$.

32. The computer readable medium of claim 25, wherein the steps further comprise repeating steps (e) and (f) and communicating the calculated corrected balance to a user.

* * * * *